(No Model.)
G. F. CALLAGHAN.
PNEUMATIC TIRE.
No. 503,560. Patented Aug. 15, 1893.
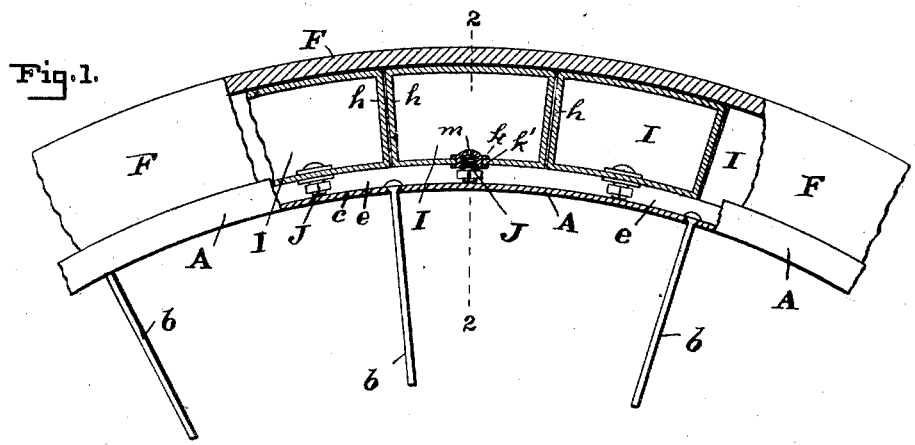
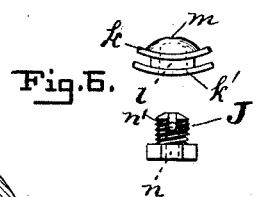
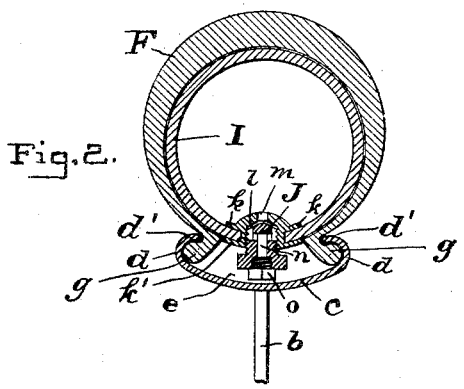
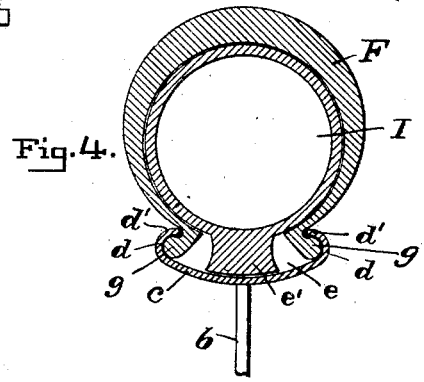
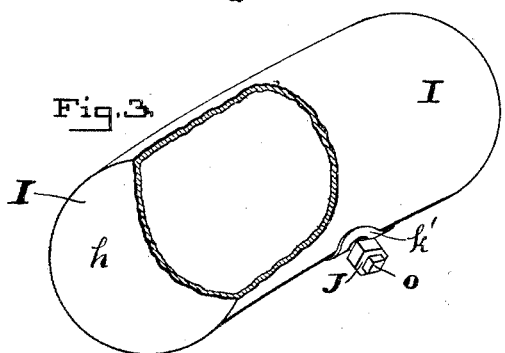
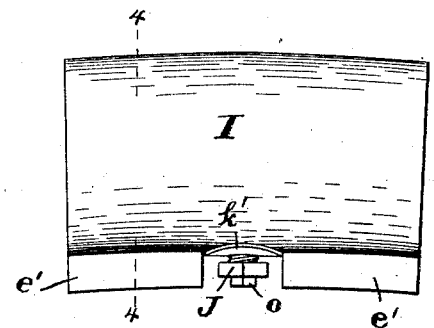
Witnesses:
A. O. Babendreier.
Chas. B. Mann Jr.
Inventor:—
Geo. F. Callaghan
By Chas. B. Mann
atty

UNITED STATES PATENT OFFICE.

GEORGE F. CALLAGHAN, OF BALTIMORE, MARYLAND, ASSIGNOR OF ONE-HALF TO EDWIN D. DURBOROW.

PNEUMATIC TIRE.

SPECIFICATION forming part of Letters Patent No. 503,560, dated August 15, 1893.

Application filed March 25, 1893. Serial No. 467,611. (No model.)

*To all whom it may concern:*

Be it known that I, GEORGE F. CALLAGHAN, a citizen of the United States, residing at Baltimore, in the State of Maryland, have invented certain new and useful Improvements in Pneumatic Tires, of which the following is a specification.

This invention relates to certain improvements in pneumatic tires for the wheels of bicycles.

The object is to provide a pneumatic tire made up of separate and unconnected air-chambers, each having a segment shape and each having an inlet independently opened and closed by a valve acting positively both ways; all of the unconnected air-chambers are seated on the metal rim of the wheel and inclosed by a cover having beaded edges which engage hooks on said rim.

The invention is illustrated in the inclosed drawings, in which—

Figure 1, is a side elevation, partly in section, of a portion of a wheel-rim, showing the unconnected air-chambers, and the cover. Fig. 2, is a cross-section on the line 2—2. Fig. 3, is a perspective view of one of the segment air-chambers. Fig. 4, is a cross-section on the line 4—4. Fig. 5, is a side-view of one of the air-chambers. Fig. 6, is a view of the valve separate.

The metal rim, A, of the wheel has spokes, $b$, as usual and its inner face, in cross-section, is convex rounded, as at, $c$, while its edges, $d$, have a rounded curve inward. The rim thus shaped, has on its outer face a circumferential groove $e$, at each side of which is a hook, $d'$, formed by the inward-curved edge.

The cover, F, is of rubber or other suitable material and has beaded edges, $g$. The beads project wholly from the plane of the exterior surface of the cover and thus form hooks which take into the circumferential groove and engage with the hooks, $d'$, on the edges of the metal rim.

The segment-shaped air-chambers, I, are made of rubber, have flat ends, $h$, and abut close together, as shown in Fig. 1. They are entirely independent of each other, and are unconnected with each other. Each chamber has preferably a longitudinal bar or rib, $e'$, which projects into the circumferential groove, $e$, on the rim and serves as a base or support for the chamber; the chamber, however, is also supported on the cover, F, which in turn rests on the inward-curved hooks on the rim. In some cases, therefore, the bar or rib base, $e'$, may be dispensed with, but the chamber must remain sealed. Each air-chamber has on that part of its curved side which is adjacent to the rim, a valve, J, which securely confines the air when the chamber is charged and which can be opened and will remain open when it is desired to charge the chamber. Its action is therefore positive both ways. This valve comprises an eyelet which is attached to the wall of the chamber—one flange, $k$, of the eyelet being on the inner side and the other flange, $k'$, on the outer side of the wall. On the outer side the eyelet has a screw-socket, $l$, and on the inner a port, $m$, and a seat surrounding said port. The plug-valve, J, has a central hole, $n$, and a cross-passage, $n'$. When the plug-valve is screwed tight into the socket, $l$, the end of the plug will bear on the seat and close the port, $m$. The air-chamber is then tightly sealed. When the plug is partly unscrewed, the port, $m$, will be open and air can pass through the central hole, $n$, to the cross-passage, $n'$, and thence to the port, $m$.

The plug-valve, J, has its central hole screw-threaded to receive the nozzle of an air-compressor. When the chamber has been filled and before disconnecting the nozzle of the air-compressor, the plug-valve, J will be turned to close the port, $m$. After the nozzle of the air-compressor has been removed, the central hole, $n$, may, if desired, be closed by a screw-plug, $o$. Should the plug-valve, J, accidentally become partly unscrewed and thereby open the port, $m$, the screw-plug, $o$, will prevent the air in the chamber from escaping. The head of the projecting-plug-valve, J, and the plug, $o$, take into the circumferential groove, $e$, on the rim. Where a base-rib, $e'$, is employed on the segment-chambers, it will stop short on each side of the projecting plug-valve, J, as seen in Fig. 5, so that both the base-rib and plug-valve will project into the groove, $e$.

It will be seen that the cover, F, incloses all of the separate chambers, I, and confines them to their position on the rim, by the two beaded edges of the cover engaging the hooked edges of the rim. In case any one of the air-chambers should be punctured, so as to allow the escape of its air, the punctured chamber may be quickly detached by pressing in one side of the cover close to the rim and thus causing one of the beads, g, to move toward the base-rib, e', and disengage from its hook, d'. By now further disengaging a portion of the cover for a sufficient length, the punctured air-chamber which has no connection with the others, may then be easily removed, and a new one inserted. The edge of the cover that was disengaged may then be restored to its position again. By these separate air-chambers, the wheel is supported by the pressure of the air in a few chambers nearest the ground, and by the particular construction shown the tire and cover have a firm seat on the rim and the cover may be easily detached to remove the air chambers.

Having described my invention, I claim—

1. In a bicycle tire, the combination of the metal rim having a circumferential groove at each side of which is an inturned hook, d', a tire made of segmental air-chambers, each having a longitudinal base bar or rib, e', which projects into the circumferential groove; and a cover inclosing all the air-chambers and having along each edge a beaded hook, g, which engages with the said inturned hooks on the rim.

2. In a bicycle tire, the combination of the metal rim having a circumferential groove at each side of which is an inturned hook, d', a tire made of segmental air-chambers each having a positive acting valve which projects into the circumferential groove; and a cover inclosing all the air-chambers and having along each edge a beaded hook, g which engages with the said inturned hooks on the rim.

In testimony whereof I affix my signature in the presence of two witnesses.

GEORGE F. CALLAGHAN.

Witnesses:
 ARTHUR O. BABENDREEIR,
 CHAS. B. MANN, Jr.